No. 680,935. Patented Aug. 20, 1901.
W. B. MURPHY.
FASTENING DEVICE FOR GLOVES, &c.
(Application filed Aug. 17, 1898.)
(No Model.) 3 Sheets—Sheet 1.
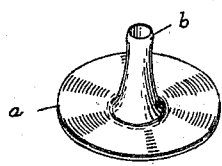
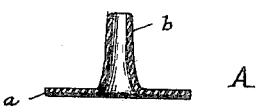
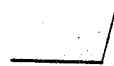
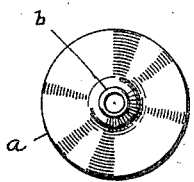
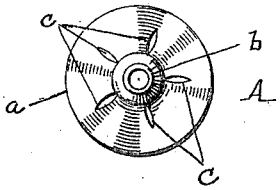
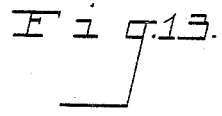
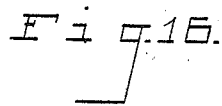
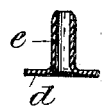
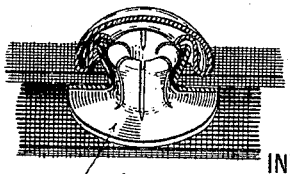
WITNESSES:
G. A. Taylor
William Littauer
INVENTOR
William B. Murphy No. 680,935. Patented Aug. 20, 1901.
W. B. MURPHY.
FASTENING DEVICE FOR GLOVES, &c.
(Application filed Aug. 17, 1898.)

(No Model.) 3 Sheets—Sheet 2.

WITNESSES:
G. A. Taylor
William Littauer

INVENTOR
William B. Murphy

No. 680,935. Patented Aug. 20, 1901.
W. B. MURPHY.
FASTENING DEVICE FOR GLOVES, &c.
(Application filed Aug. 17, 1898.)
(No Model.) 3 Sheets—Sheet 3.

WITNESSES:
G. A. Taylor
William Littauer

INVENTOR
William B. Murphy

THE NORRIS PETERS CO., PHOTO-LITHO., WASHINGTON, D. C.

UNITED STATES PATENT OFFICE.

WILLIAM B. MURPHY, OF NEW YORK, N. Y., ASSIGNOR TO LUCIUS N. LITTAUER, OF GLOVERSVILLE, NEW YORK.

FASTENING DEVICE FOR GLOVES, &c.

SPECIFICATION forming part of Letters Patent No. 680,935, dated August 20, 1901.

Application filed August 17, 1898. Serial No. 688,773. (No model.)

*To all whom it may concern:*

Be it known that I, WILLIAM B. MURPHY, a citizen of the United States, residing at the city of New York, in the county and State of New York, have invented a certain new and useful Improvement in Fastening Devices for Gloves and other Articles, of which the following is a specification.

My improvement relates to the stud member of that class of fastening devices for gloves and other articles which are composed of a resilient or spring stud member and a rigid socket member adapted to receive and hold the stud member, the former being adapted to be attached to one flap and the latter to the other flap of the glove or other article, so that when the head of the resilient stud member is made to occupy the socket member the two flaps become firmly fastened together, but so that a ready disengagement is permitted, and my present improvement comprises a new and improved resilient or spring stud member for use in such relation; and the object of my present invention is to improve upon constructions heretofore known by reducing the number of parts of which the spring-stud is composed, so as to obviate the labor of assembling divers parts and accurately securing them together and also to make a stud which can be cheaply, quickly, and firmly attached to a fabric and at the same time to secure all the elasticity of the stud which is desirable and to strengthen or support the spring portion of the stud, so that its capacity of engaging with the socket member shall not be endangered by accidental blows.

Figure 5:
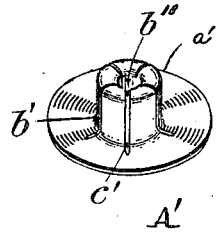
Figure 6:
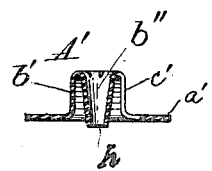
Figure 7:
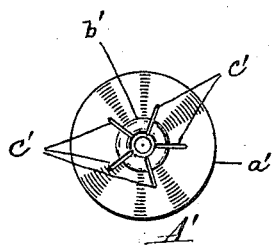
Figure 8:
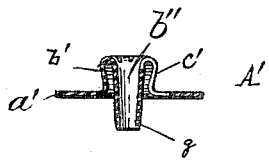
Figure 14:
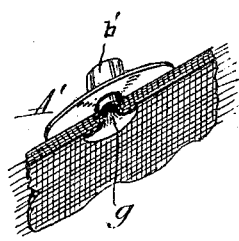
Figure 9:
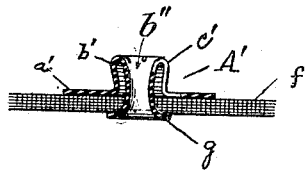
Figure 10:
Figure 11:
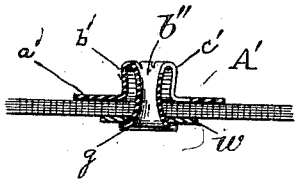
Figure 12:
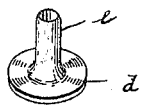
Figure 13:
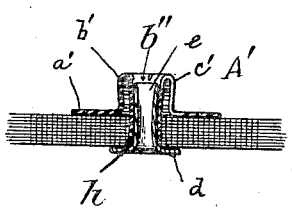

In the accompanying drawings, Figure 1 is a view in perspective of the piece from which the stud is formed and made, the piece being shown in a position upside down as compared with that which it occupies in Figs. 5, 6, 8, 9, 11, 15, and 16. Fig. 2 is a vertical sectional view of the same, also in a position upside down with reference to the position occupied in the subsequent figures above mentioned. Fig. 3 is a plan view of the piece looking at it on the side from which the tubular part projects. Fig. 4 is a similar view of the piece after apertures or slits have been cut therein, as hereinafter described. Fig. 5 is a view in perspective of the shape given to the piece by the first operation after the apertures or slits have been cut, the piece having been reversed in position from that shown in Figs. 1 and 2, so as to cause the tubular part to point downward. Fig. 6 is a sectional view of the same. Fig. 7 is a plan view of the same looking from above downward. Fig. 8 is a sectional view of the piece adapted to be used without an eyelet. Fig. 9 is a sectional view of the stud shown in Fig. 8 attached to the fabric. Fig. 10 is a plan view of a washer. Fig. 11 is a view of the stud, shown partly in section and attached to the fabric, the washer being used. Fig. 12 is a view in perspective of the eyelet which may be used for attaching the stud to the fabric. Fig. 13 is a sectional view of the same. Fig. 14 is a view in perspective of the stud attached to the fabric in the manner shown in Fig. 9, the lower part of the tube being partly cut away. Fig. 15 is a view in section of a modification. Fig. 16 is a view in perspective of the completed stud attached to the fabric in engagement with a socket shown in section.

Similar letters of reference indicate similar parts.

The drawings are on a considerably-enlarged scale.

The piece A, Figs. 1, 2, and 3, from which the spring-stud is formed, is struck up from sheet metal and is composed of the tubular part $b$ and the horizontal flange $a$, which should be in about the proportions shown in the drawings, and it will be noticed that the tubular portion $b$ tapers slightly as it recedes from the horizontal flange. The piece A being formed is placed in a press in which the radially-located slits or apertures $c$ are cut in the flange $a$ contiguous to the base of the tapering tube. (See Fig. 4.) I prefer to cut five or six of these apertures, preferably five; but there may be a greater number, if desired, though a greater number tends to weaken the stud, and there may be a fewer number, but a fewer number will tend to diminish the resiliency of the stud. After the slits or apertures $c$ are formed in the piece A the piece is then placed in another press and a portion of the flange $a$ which is adjacent to the base of the tapering tube $b$ and which contains the apertures $c$ is drawn downward, so as to form a cylindrical head $A'$, (shown in Figs. 5, 6, 7, and 8,) where it is seen that in drawing the metal the slitted portion of the flange $a$ in Fig. 4 has in part and almost entirely been drawn into an enlarged tube, the slits or apertures $c$ of Fig. 4 have become narrowed and elongated, so that the metal between the slits constitutes the sides of what is to form a resilient head, a small portion of the slits $c'$, Fig. 5, still remaining in the horizontal flange $a'$. In Fig. 5 is now shown the stud member $A'$, with head $b'$ and interior tube or support $b''$. If the stud is intended to be attached to the fabric by means of an eyelet, Figs. 12 and 13, the metal should be drawn so that the end $h$, Fig. 6, will project below the flange $a'$ about the distance shown in Fig. 6. If, however, the stud is intended to be attached without an eyelet, then the piece A, Fig. 1, should be made with a longer tube and the metal should be drawn downward so that the end $g$, Fig. 8, will project below the flange $a'$ about the distance shown in Fig. 8, so as to afford sufficient metal to be spread out on the under surface of the fabric and hold the stud in place, as shown in Figs. 9 and 14. The piece, Fig. 5, is then placed in another press, where the head is given a somewhat spherical form, which operation results is still further slightly narrowing and elongating the slits and drawing up the metal in the flange adjacent to the spherical head and drawing over and downward a portion of the metal between the slits, thereby increasing the resiliency of the head and also the firmness of the spherical head without impairing its resiliency, whereby the forms shown in Figs. 6 and 8 are finally obtained, having the head $b'$, made resilient by vertical slits $c'$, a flanged base $a'$, integral with the lower end of the head $b'$, and a centrally-located interior tube $b''$, integral with the upper end of the head $b'$ and depending therefrom, said tube operating as a support for the resilient head. When the piece has reached the condition shown in Fig. 6 or Fig. 8, it is ready for attachment to the fabric. This attachment is performed by first perforating the fabric with a hole only sufficiently large to allow the passage therethrough of that portion $g$, Fig. 8, of the tube $b''$ which projects below the plane of the under side of the flange $a'$. This portion of the tube is then passed through the hole in the fabric until the lower side of the flange $a'$ of the stud rests upon the upper side of the fabric, when by means of a tool or press operating within the downwardly-projecting portion of the tube (indicated at $g$ in Fig. 8) the tube is spread outwardly, so as to contact with the under surface of the fabric in the manner shown in Fig. 9, where $f$ represents the fabric and $g$ the spread-out tubular portion, or a washer $w$, Fig. 10, may be laid on the under side of the fabric, the tube passing through the aperture therein, and the lower part $g$, Fig. 8, of the tube $b''$ may be spread out upon the washer $w$, as shown in Fig. 11. When formed and attached in this manner, the stud, including the flange on the upper side of the fabric, whereby the resilient head is firmly seated upon the fabric, the resilient head itself, and the flange on the under side of the fabric, whereby the stud is attached to the fabric, is composed, as seen, of a single piece or a single piece and a washer, and the assembling together and nice adjustment of several parts is consequently obviated, or instead of securing the stud in the manner just described I may use the eyelet shown in perspective in Fig. 12 and in vertical sectional view in Fig. 13. This eyelet has the flanged portion $d$ and the tubular portion $e$, which tubular portion is small enough in diameter to enter the downwardly-projecting tubular portion $h$ of the tube $b''$, as shown in Figs. 6 and 15, and should be of such length as to penetrate the tube $b''$, Figs. 6 and 15, so that the top of the tube $e$ of the eyelet may be spread outwardly and occupy the wider portion of the tube $b''$, Figs. 6 and 15. The stud having been formed and shaped as shown in Figs. 6 and 15 and placed upon the fabric, the lower depending portion of the tube $b''$ having been passed through the hole in the fabric formed as and for the purpose just before described, the eyelet, Fig. 12, is then applied so that the tubular part $e$ of the eyelet is passed upward within the downwardly-depending part $h$ of the tube $b''$, Figs. 6 and 15, so that the top of the part $e$ of the eyelet will be well within the wider part of the downwardly-projecting tube $b''$ and so that the flange $d$ of the eyelet lies against the under side of the fabric. Then by means of a suitable press the upper part of the tubular part $e$ of the eyelet is spread within the enlarged area of the tube $b''$, so that the eyelet cannot be withdrawn from the stud. (See Fig. 15.) This method of attaching the eyelet gives a desirable finish to the under portion of the fabric and at the same time secures the stud to the fabric and is the method of attaching the stud which I prefer, although it involves the use of one additional piece. It is obvious that the extent to which the tube $b''$ will project downwardly will depend to a considerable degree upon the thickness of the fabric. It may also be made so as not to project downwardly below the plane of the upper surface of the fabric in case an eyelet is intended to be used; but I prefer to construct the stud in the manner shown, as greater firmness is thereby obtained.

The interior tube $b''$, especially when reinforced by the tubular portion of the eyelet, (see Fig. 15,) affords a firm support for the exterior slitted portion of the stud and effectually secures the same against distortion by blows. The slits in the sides of the spherical head terminating in the horizontal flange $a$ and extending over the top of the head somewhat into the interior gives to the stud all desirable resiliency, and the labor and difficulty of assembling small parts together and nicely adjusting them is entirely avoided or reduced to assembling two parts at the most.

I claim as new—

1. A spring-stud intended for engagement with a rigid socket, consisting of a head made resilient by vertical slits, a flanged base integral with the lower end of the head, a centrally-located interior tube integral with the upper end of the head and depending therefrom, said tube operating as a support for the resilient head.

2. A stud intended for engagement with a rigid socket, said stud consisting of a head made resilient by vertical slits, a flanged base at the lower end of the head, a centrally-located interior tube integral with the upper end of the head, depending therefrom and projecting below the under side of the fabric to which the stud may be attached, said tube operating as a support for the resilient head.

3. A spring-stud consisting of a head, made resilient by vertical slits, a centrally-located interior tube integral with the upper end of the head, and depending therefrom, in combination with a flanged eyelet adapted to enter the centrally-located interior tube and to be expanded within the same to attach the stud to the fabric.

4. A stud member for separable fasteners having a base-flange, outwardly-bowed resilient sections extending therefrom to form a head and an internal attaching-stem formed integral with and depending from the top of said head; substantially as described.

5. A stud member for separable fasteners having a base-flange, outwardly-bowed resilient sections extending upwardly therefrom to form a head and a tubular internal attaching-stem formed integral with and depending from the top of said head, the lower end of said stem being contracted; substantially as described.

6. A spring-stud consisting of a head, made resilient by vertical slits, a centrally-located interior tube integral with the upper end of the head depending therefrom, and means for securing the centrally-located interior tube to the fabric; substantially as described.

In witness whereof I have hereunto set my hand this 14th day of June, 1898.

WILLIAM B. MURPHY. [L. S.]

Witnesses:
G. A. TAYLOR,
WILLIAM LITTAUER.

It is hereby certified that in Letters Patent No. 680,935, granted August 20, 1901, upon the application of William B. Murphy, of New York, N. Y., for an improvement in " Fastening Devices for Gloves, &c.," an error appears in the printed specification requiring correction, as follows: In line 30, page 2, the word " is " should read *in;* and that the said Letters Patent should be read with this correction therein that the same may conform to the record of the case in the Patent Office.

Signed, countersigned, and sealed this 3d day of September, A. D., 1901.

[SEAL.]
F. L. CAMPBELL,
*Assistant Secretary of the Interior.*

Countersigned:
   E. B. MOORE,
      *Acting Commissioner of Patents.*